US008309192B2

(12) United States Patent
Meseguer Huertas

(10) Patent No.: US 8,309,192 B2
(45) Date of Patent: Nov. 13, 2012

(54) CONTINUOUS BAND FOR MANUFACTURING BAGS FOR HORTICULTURAL PRODUCTS AND SUCH LIKE

(75) Inventor: José María Meseguer Huertas, Beniaján (ES)

(73) Assignee: Cristobal Meseguer, S.A., Beniajan (Murcia) (ES)

( * ) Notice: Subject to any disclaimer, the term of this patent is extended or adjusted under 35 U.S.C. 154(b) by 889 days.

(21) Appl. No.: 12/440,826

(22) PCT Filed: Sep. 28, 2007

(86) PCT No.: PCT/ES2007/000548
§ 371 (c)(1),
(2), (4) Date: Mar. 11, 2009

(87) PCT Pub. No.: WO2008/040826
PCT Pub. Date: Apr. 10, 2008

(65) Prior Publication Data

US 2010/0024358 A1 Feb. 4, 2010

(30) Foreign Application Priority Data

Oct. 2, 2006 (ES) .................................. 200602504
Nov. 28, 2006 (ES) .................................. 200603034

(51) Int. Cl.
*B29D 22/00* (2006.01)
*B29D 23/00* (2006.01)
*B32B 1/08* (2006.01)

(52) U.S. Cl. ..................... 428/36.9; 428/35.2; 428/35.5; 428/131; 428/134; 383/14; 383/20; 383/109

(58) Field of Classification Search ................. 428/35.2, 428/35.5, 131, 134, 36.9; 383/14, 20, 109
See application file for complete search history.

(56) References Cited

U.S. PATENT DOCUMENTS

| | | | |
|---|---|---|---|
| 3,850,724 | A | 11/1974 | Lehmacher |
| 4,510,620 | A | 4/1985 | Langen et al. |
| 2006/0182369 | A1 | 8/2006 | Schneider et al. |

FOREIGN PATENT DOCUMENTS

| | | |
|---|---|---|
| EP | 0 416 063 | 3/1991 |
| EP | 0 669 260 | 8/1995 |
| ES | 2 056 452 | 10/1994 |
| ES | 2056452 | 10/1994 |
| ES | 2 204 271 | 4/2004 |
| GB | 678730 | 9/1952 |

OTHER PUBLICATIONS

International Search Report issued Jan. 30, 2008 in the International (PCT) Application No. PCT/ES2007/000548.

*Primary Examiner* — Michael C Miggins
(74) *Attorney, Agent, or Firm* — Wenderoth, Lind & Ponack, L.L.P.

(57) ABSTRACT

A continuous band for producing bags for fruit and vegetable products is formed from a continuous plastic sheet which has been die-cut to produce a series of small holes which are closed using mesh or net fragments fixed along the periphery of the holes by heat-sealing, gluing or any other conventional manner. An area of the continuous sheet intended to contain a handle is provided with a transverse patch of pre-determined hardness in order to reinforce the area used to hold the bag once it has been filled, such that the thickness of the band-forming plastic sheet can be significantly reduced, specifically by a value of the order of 40%, without affecting the performance of the bag in terms of mechanical strength since the area in which the greatest strains are concentrated corresponds exactly to the area containing the handle.

6 Claims, 9 Drawing Sheets

CONTINUOUS BAND FOR MANUFACTURING BAGS FOR HORTICULTURAL PRODUCTS AND SUCH LIKE

BACKGROUND OF THE INVENTION

I. Technical Field

The present invention relates to a continuous band, of the type used to manufacture horticultural products and the like, by means of a longitudinal thermosealing or gluing of the band along its longitudinal edges, to convert it into a tube, also continuous, through which means of parallel welding and transversal cutting unitary bags are produced, in addition to the sealing and independisation thereof, bags which combine totally sealed plastic areas with mesh areas in order to allow the viewing and especially the aeration of the products contained therein.

The object of the invention is to provide a band that, while offering a high mechanical resistance for the bag, optimum protection against light for the products contained therein, greater bag printing capacity and higher machine-working speed due to the greater ease of welding of the sheets, said band incorporates a reinforcement in the bag handle gripping area that considerably reduces the sheet thickness required to support the load contained therein, substantially lowering product manufacturing costs and also having a beneficial effect on the environment.

II. Description of the Related Art

Certain horticultural products, such as oranges, lemons, potatoes, etc., have been marketed for a long time in plastic bags with a reticulated structure, which allow both aeration and direct viewing of the product.

Occasionally, the production of these bags is based on a mesh body that is closed by both ends after housing the product in its interior, which can optionally have one of said handle ends that facilitate the manual transport thereof after acquisition by the consumer.

On other occasions, the production of these bags is based on a continuous band which is laminated and closed upon itself to configure said tubular body, through a longitudinal thermo-welded seam, after which the aforementioned process is repeated, in such a manner that in these cases the conformation of the tubular body, i.e. the transformation of the continuous band into a laminated body, is carried out simultaneously with the filling and independisation of the bags.

In any case, the common problem with all these types of bags resides in the fact that this mesh body is unable to receive printed information, which is essential in most cases, as the product brand, characteristics, barcode, etc. must necessarily be established on the bag itself.

Although there are different solutions to this problem, they are all based on the fixation to the mesh bag, during the production process itself, of one or more continuous plastic strips, bearing the information that is fixed to the base structure of the bag by means of, for example, the conformation welds of the latter, continuous plastic strips that represent a complementary contribution of material to the bag, with the consequent increase in cost.

A more advanced solution is that offered by the Spanish utility model with application Ser. No. 9701734, of which the applicant itself is the holder, which describes a bag for horticultural products and the like, of the type mentioned in the second place, i.e. of the type having a structure based on a continuous band that closes upon itself to configure a tubular body, at the time of conformation and filling of the unitary bags to be produced therethrough.

Specifically, in this utility model the aforementioned band was envisaged as having a structure based on sealed or continuous plastic strips, alternating with mesh strips or bands, fixed by means of thermal welding to the former, in such a manner that, in a preferred example of an embodiment thereof, each, flattened and with a rectangular outline, offers a wide sealed and intermediate band on each of its sides and, on either side thereof, narrower mesh strips, in such a manner that the latter allows the aeration and viewing of the product, while the former allows the addition of printed information.

The applicant itself is also the holder of invention patent P200200427, which describes a continuous band for manufacturing bags comprised of a single continuous plastic sheet, the width of which coincides with that of the band itself, wherein, by means of a punching operation, a series of small areas that determine the existence of windows which, for example, may be aligned along the imaginary axis of the continuous band, in correspondence with what will become the axis of the front side of the bags, and on the side edges thereof, are eliminated.

Said windows are sealed with the collaboration of mesh fragments, which are fixed to the base sheet by means of thermal welding, throughout its perimeter, and which comprise the viewing and aeration areas of the internal product.

Even though this special structure represents greater homogeneity of the constituent material of the continuous band, a reduction in weight thereof, greater printing capacity and greater protection against light, it has the fundamental problem that, for the finally produced bag to have suitable mechanical resistance, the continuous plastic sheet must have a specific thickness, which implies associated manufacturing costs which it would be desirable to reduce.

SUMMARY OF THE INVENTION

The improved continuous band proposed by the invention satisfactorily resolves the foregoing problem, in such a manner that, based on the previously described structure, it is capable of reducing the thickness of the continuous plastic sheet by approximately 40%, while offering the same features as those of the aforementioned patent.

To this end, it has been envisaged that, based on said structure, which involves the participation of a single continuous plastic sheet, coinciding in width with that of the band itself, wherein by means of punching a series of small windows which, for example, can be aligned along the imaginary axis of the continuous band, in correspondence with what will be the axis of the front side of the bags, and particularly the side edges thereof, windows which are sealed by means of mesh or netting, fixed by thermal welding, gluing or any other conventional means, throughout the perimeter of said windows, the invention is focused on the incorporation of said continuous sheet, in a transversal direction and coinciding with what will be the area of the bag in which the handle will be placed, of a patch, having a specific hardness, in order to reinforce the gripping area of the bag once filled with the horticultural or similar product, in such a manner that said reinforcement allows the thickness of the plastic sheet of the band to be considerably reduced, specifically by around 40%, while offering the same features in terms of mechanical resistance of the bag, as the area that supports the greatest tension and through which the bag could break is precisely the handle, area which with the reinforcing patch included in the invention, becomes sufficiently robust so as to support the tension to which said handle will be subject during the manual transport of the bag.

In a variant of embodiment, a first reinforcing patch is disposed on each part of the continuous band wherein a handle has been envisaged, specifically in that which will be the inner side of the bags, as in the prior patent which, rather than being affected by the orifice that will constitute the handle for the passage of the fingers of a hand, is affected by a punching that determines the existence of a "U-shaped" strip which affects both the aforementioned patch and plastic sheet that constitutes the continuous band, but that does not constitute a definitive cut, but rather a considerably weakened line that will allow said "U-shaped" strip to be folded along the ends of its side branches, projecting outwards with respect to the entrance of the bag body.

A second patch is disposed on this patch and also on what will be the inner side of the bag, which is fixed by means of thermal welding or by any other means to the first patch only in those parts of the latter unrelated to said "U-shaped" strip, in such a manner that this second patch seals the orifice that will result from said punching of the "U-shaped" strip, thereby preventing the product from exiting the bag, said second patch also constituting, on its outer side, a physical support for any type of information.

Optionally, the structure described can be repeated in each continuous band fragment corresponding to a bag, for the purpose of incorporating two diametrically opposed outer handles to said bags.

In accordance with this structure a continuous band is achieved, also for the continuous production of bags, equipped with outer handles at the entrance of the body thereof, but with an integral use of the material, i.e. without the loss represented by configuring the handle at the expense of the sheet body itself, leaving abundant remnants of surface area between consecutive bags.

BRIEF DESCRIPTION OF THE DRAWINGS

For the purpose of completing this description and to better understand the characteristics of the invention, a set of drawings in accordance with a preferred example of practical embodiment thereof has been included as an integral part of this specification, in which the following figures have been represented in an illustrative and unlimitative manner.

DETAILED DESCRIPTION OF THE INVENTION

Figure 1:
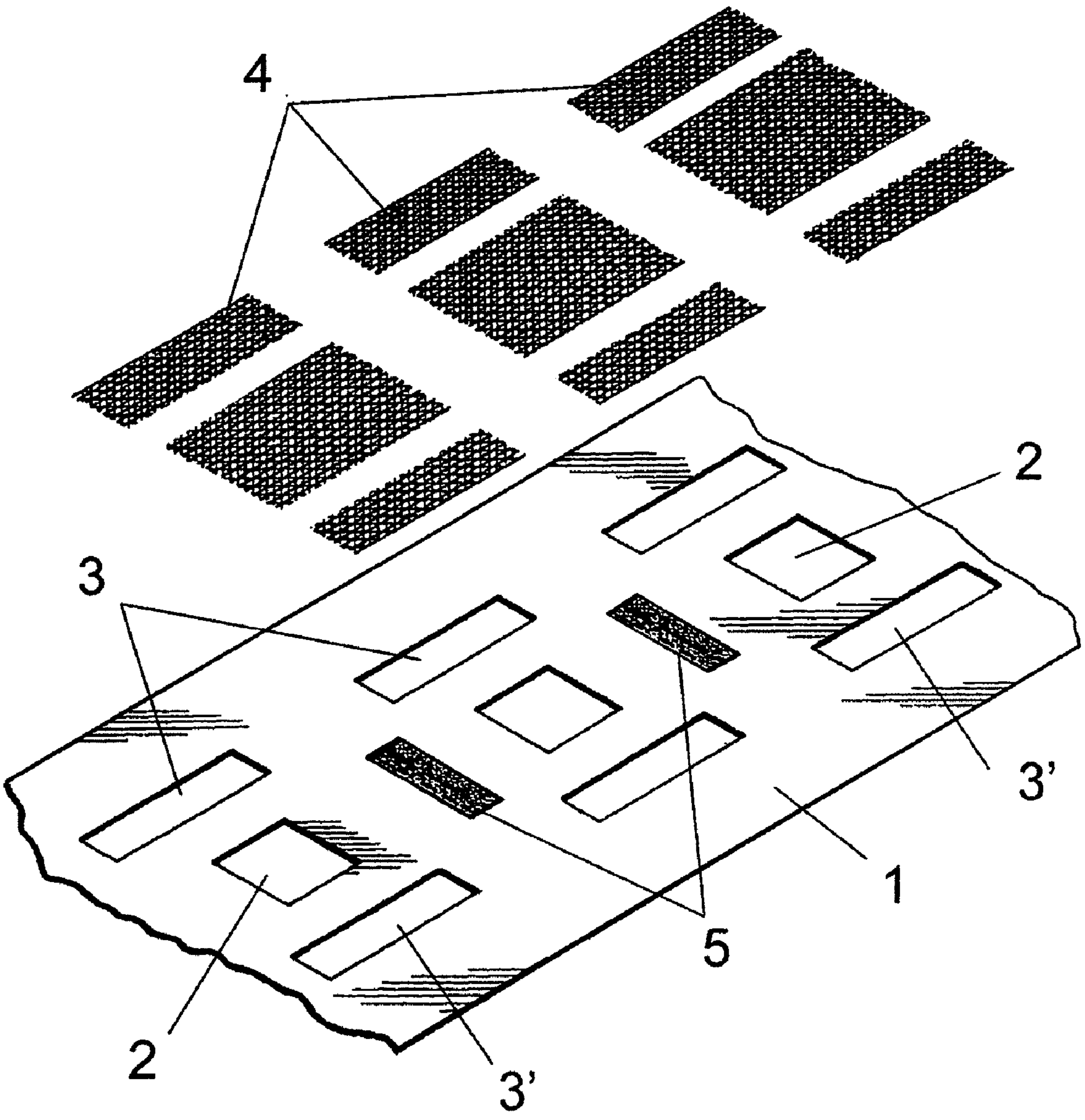
FIG. 1 shows an exploded perspective view of a continuous band for manufacturing bags for horticultural products and such like, carried out in accordance with the object of the present invention.
Figure 2:
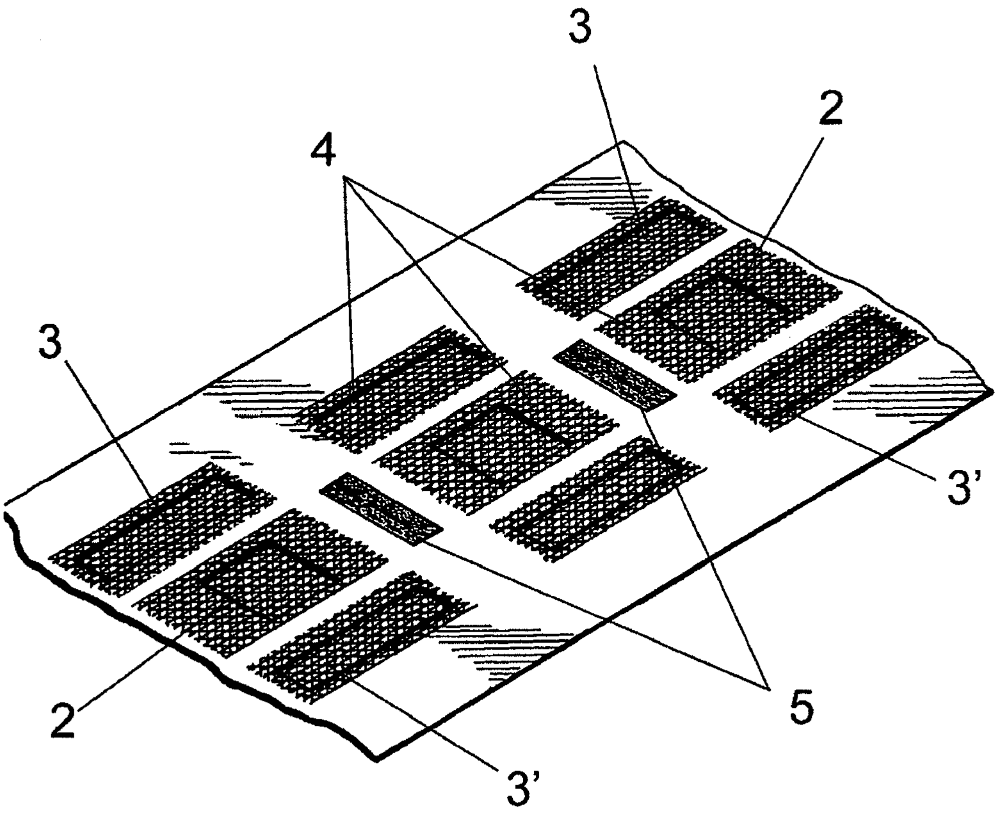
FIG. 2 also shows an exploded perspective view of the same band of the preceding figure, duly finished.

In view of the aforementioned figures, and particularly FIGS. 1 and 2, we can observe that the continuous band for manufacturing bags proposed, by the invention is comprised, in the traditional manner, of a continuous plastic sheet (1), coinciding in width with that of the band itself and consequently double in width to that of the bag to be produced, sheet (1) along which punching or window (2-3-3') groups are established, preferably a group for each bag to be produced from said continuous band, there being a minimum of one window (2) centred on what will be the front side of the bag, and optionally another pair of windows (3), (3'), in turn disposed in correspondence with what will be the side areas of said bag, each of said windows (2-3-3'), or group thereof, being designed to receive a mesh fragment (4), which is fixed to the edge thereof, as shown in FIG. 2, in such a manner that this mesh (4) allows both the aeration of the interior of the bag and the viewing of the products housed within, while sealing the windows (2-3-3'), thereby preventing the products from exiting the bag.

In accordance with the invention, a plastic sheet patch (5), having a preferably triangular configuration, with the suitable thickness to allow the reduction of the plastic sheet (1) by approximately 40%, as opposed to conventional plastic sheets, will be disposed on the sheet (1), in a transversal direction and coinciding with what will be the area of the bag where the handle thereof will be located, fixed by means of thermal welding, gluing or any other conventional means, whereby the bag's features will remain unaltered.

Figure 3:
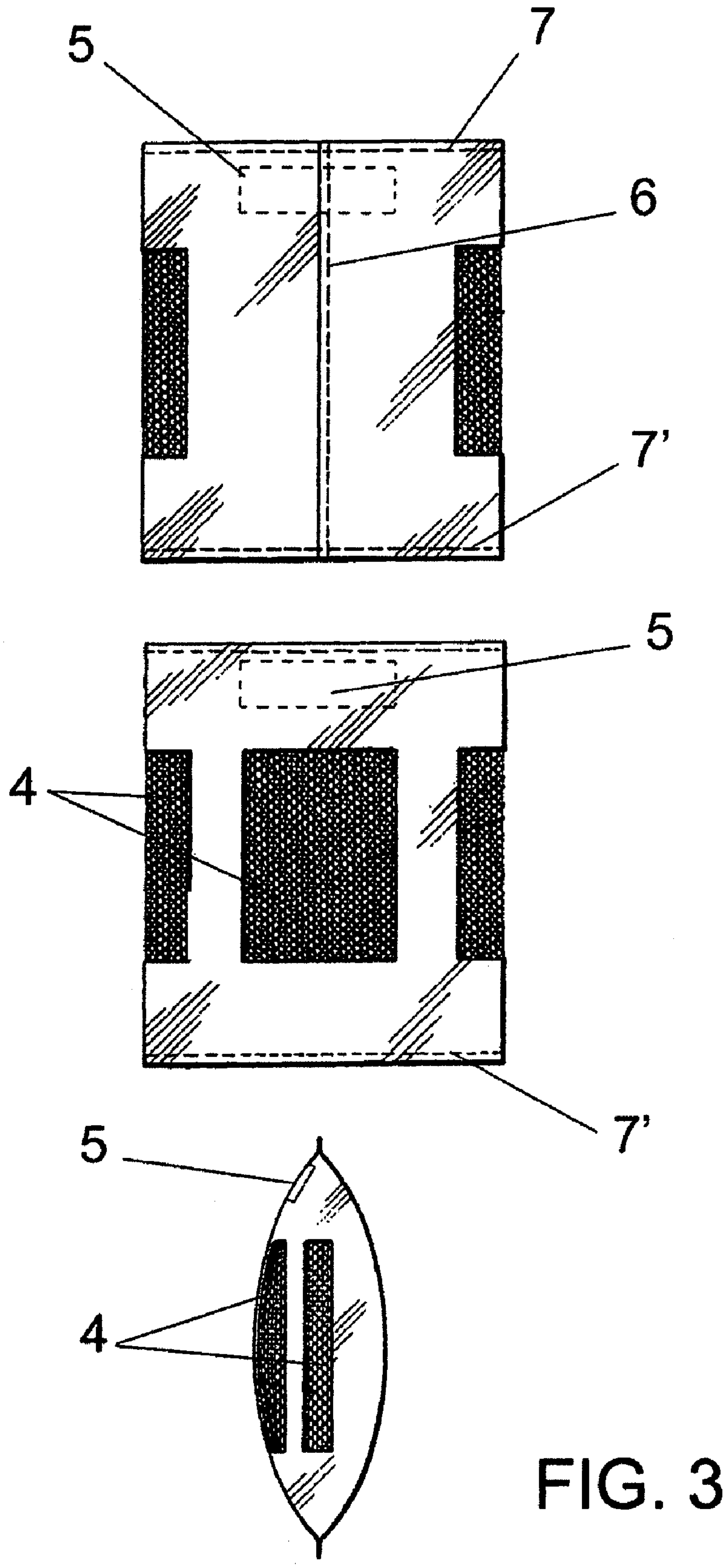
FIG. 3 shows, according to a schematic representation in elevational and side views, one of the bags which can be produced through the continuous band of the preceding figures.

As mentioned earlier, a mesh fragment (4) can exist for each group of windows (2-3-3'), as shown in FIG. 2, or a mesh fragment can exist for each of the windows of each group, as represented in FIG. 3, where we can observe the aspect of a bag produced from the continuous band of FIGS. 1 and 2, after sealing the latter upon itself along a seam of thermal welding or gluing (6) in correspondence with the longitudinal edges thereof and, after establishing welding seams (7), (7'), transversal for the conformation and sealing of each bag, and double in order to allow cutting between these for the independisation of the bags.

Figure 4:
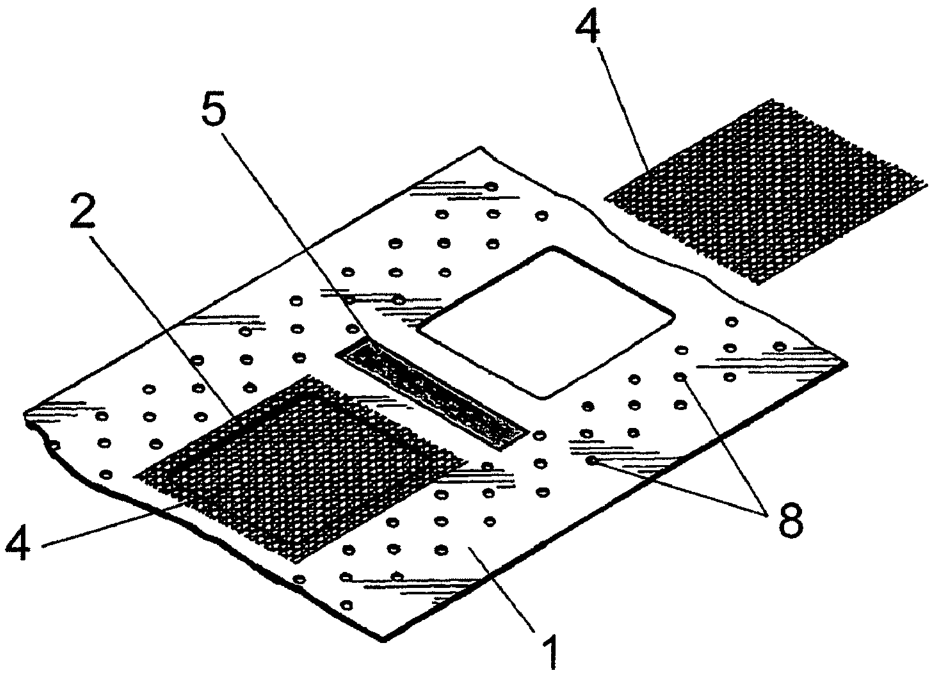
FIG. 4 shows, according to a perspective representation similar to that of FIG. 1, a variant of practical embodiment for the continuous band proposed by the invention.
Figure 5:
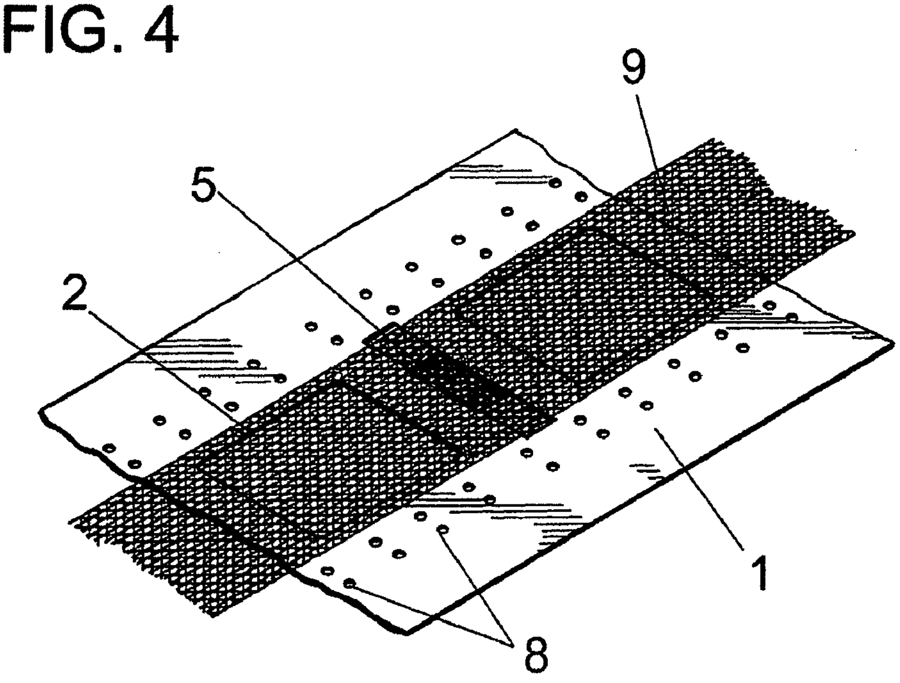
FIG. 5 shows, according to a similar representation to that of FIG. 4, another variant of embodiment of the continuous band.
Figure 6:
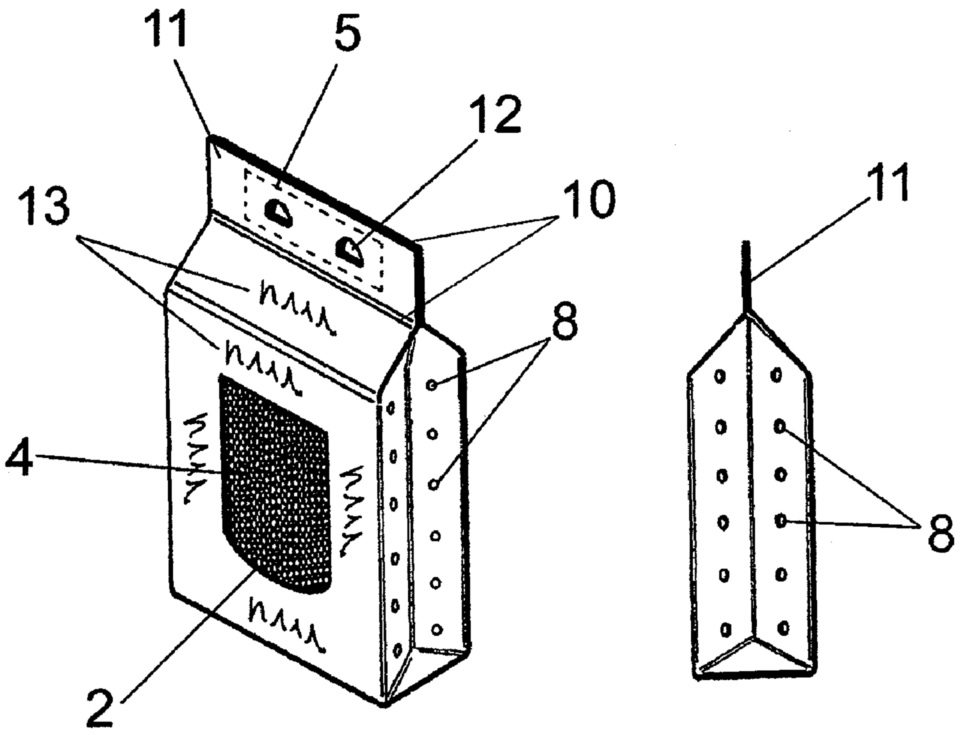
FIG. 6 shows a perspective and side views of a bag produced from any of the continuous bands of FIGS. 4 and 5.
Figure 7:
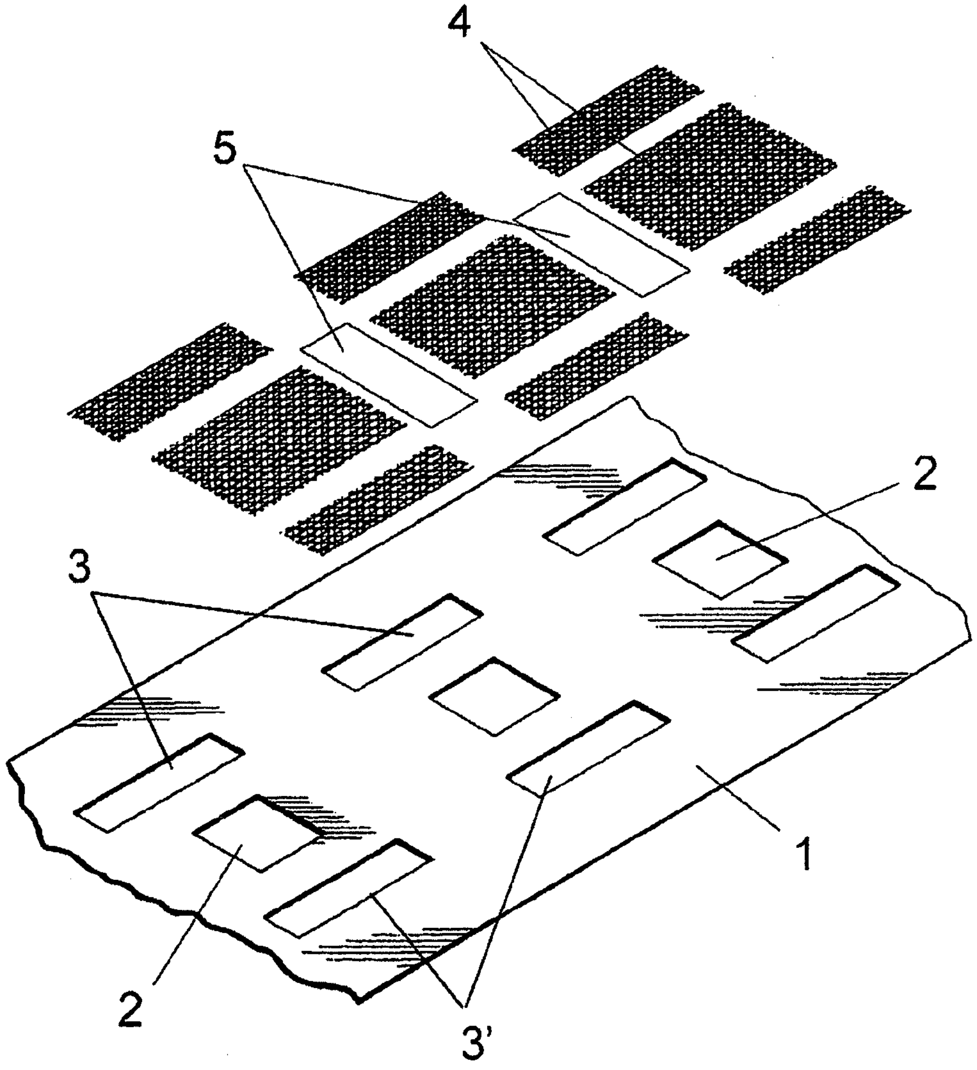
FIG. 7 shows an exploded perspective view of a continuous band for manufacturing bags for horticultural products and such like, in accordance with the improvements that are the object of the present addition, according to a final phase of the manufacture thereof.
Figure 8:
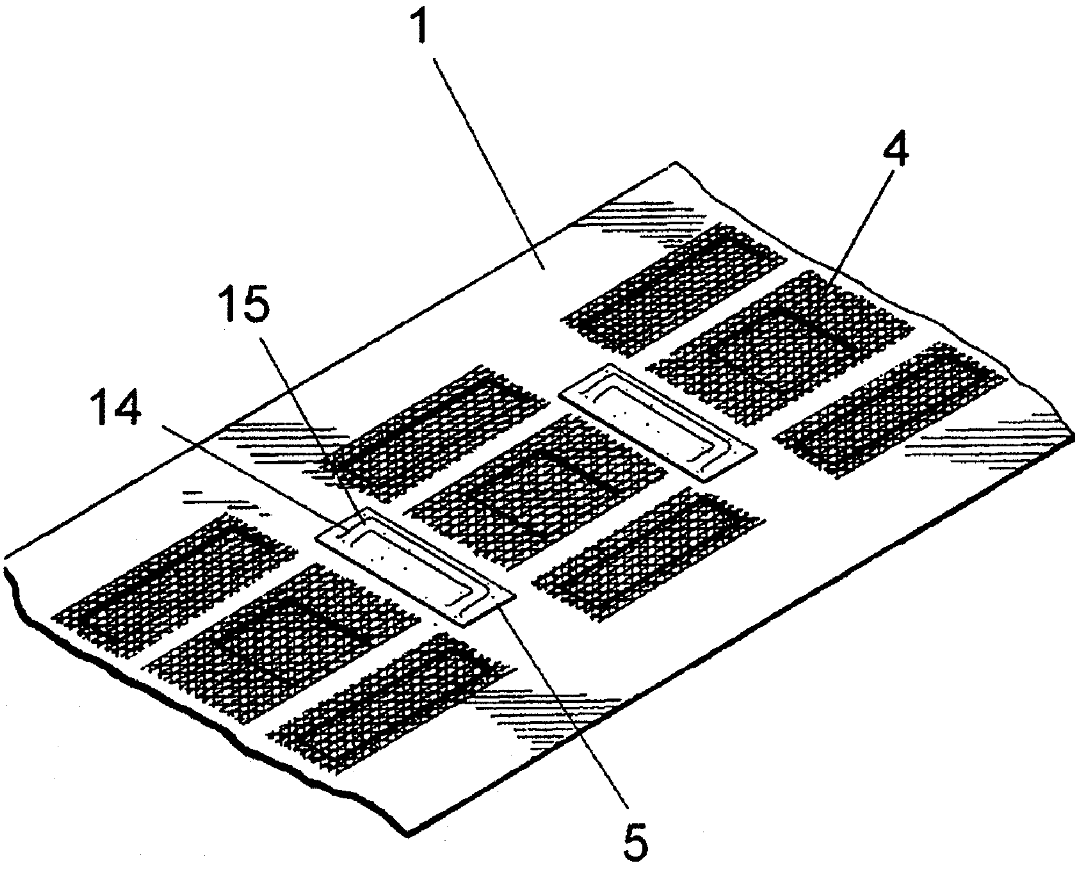
FIG. 8 shows, according to a perspective view similar to that of the preceding figure, said figure duly assembled.
Figure 9:
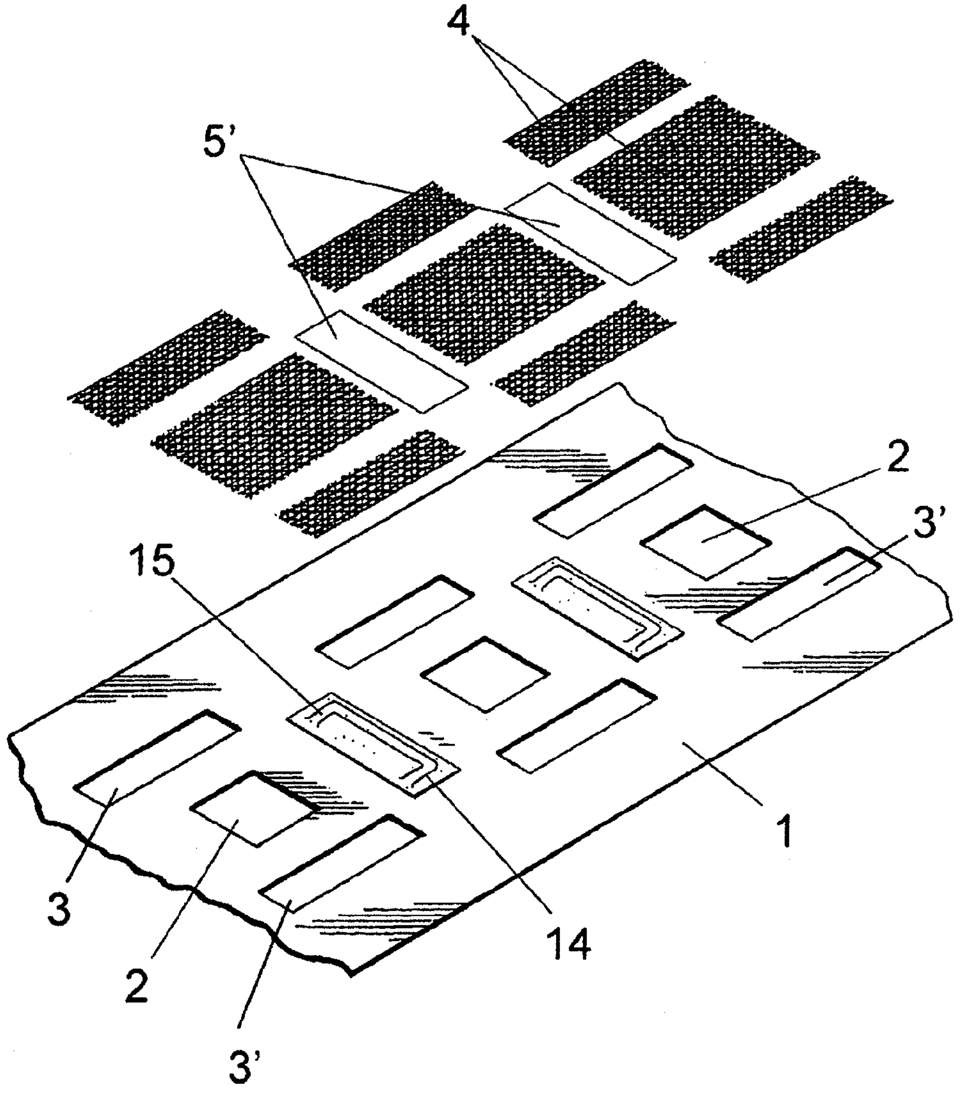
FIG. 9 shows once again according to a representation similar to that of the preceding figures, the same assembly of FIG. 2, to which the second group of patches appears duly opposed.
Figure 10:
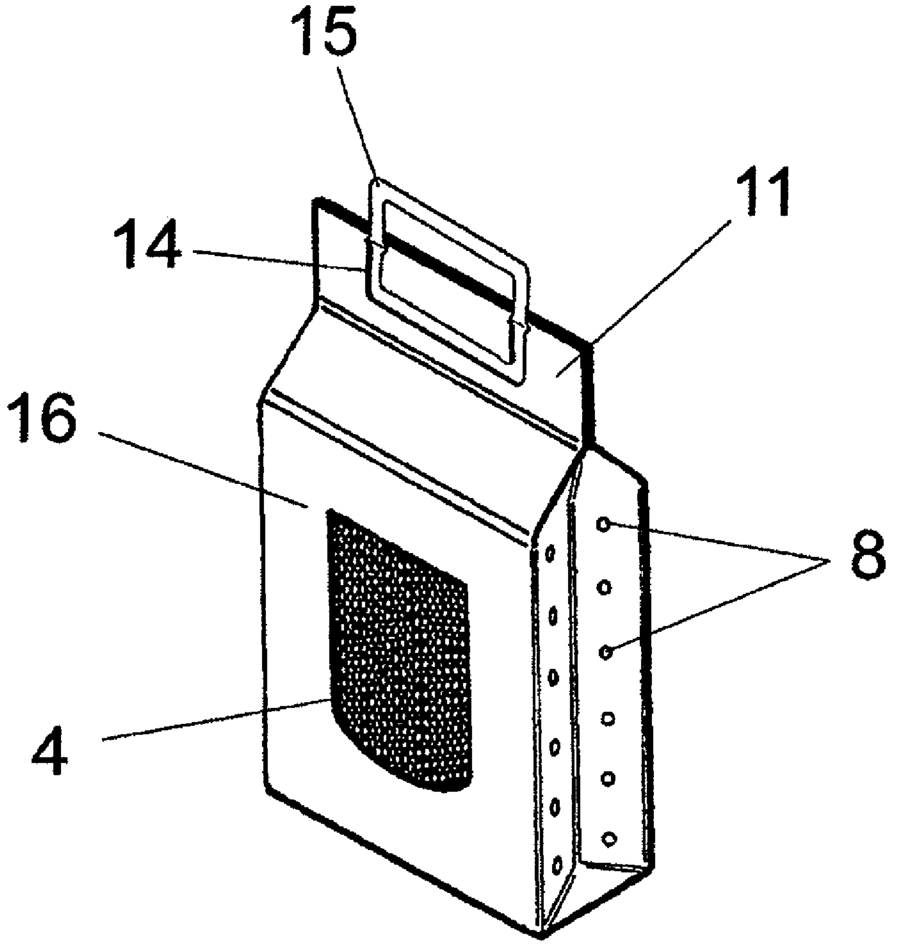
FIG. 10 shows, finally, a bag extracted from the preceding figures, perfectly finished and with its handle in use position.

The possibility shown in FIG. 4, mentioned earlier, of the existence of only one window (2) for each sector of continuous sheet (1) corresponding to a bag, that will be sealed by means of the corresponding mesh (4), in which case the marginal areas of the sheet (1) will have small holes (8) which, without having to be sealed by means of mesh fragments, collaborate in the aeration of the interior of the bag, wherein said windows (2) can be sealed by means of the corresponding mesh fragments (4), as in the example shown in FIG. 4, or all the windows can be sealed simultaneously by means of a continuous mesh fragment (9), that is fixed to the perimeter of each of the windows (2), overlapping the patches (5) fixed on the area wherein the bag handle is located, as can be observed in FIG. 5, obtaining in any of these cases, i.e. both with the continuous band of FIG. 4 and that of FIG. 5, bags such as that represented in FIG. 6, wherein by means of a double transversal thermal welding seam (10) a band (11) with grip functionality is produced for each of said bags, wherein the reinforcement patch (5) is established, assembly in which the corresponding windows or orifices (12) will be made for introducing the fingers of a hand, said handle offering a more than sufficient structural rigidity to support the tensions to which said handle will be subject during the manual transport of the bag without problems, maximum tensions that are concentrated in said area, in such a manner that, as mentioned earlier, it is possible to significantly reduce the thickness of the sheet (1), as the tensions produced by the products contained therein on the different areas of the bag are lower.

In any of the previously expounded cases, the resulting bags offer ample areas for graphic prints (13) that allude to the products contained therein.

In a variant or alternative embodiment shown in FIGS. 7, 8, 9 and 10 we can see that, after the fixing of the patch (5), punching (14) is carried out that affects both said patch (5) and the sheet (1), delimiting a "U-shaped" strip (15) with handle functionality designed to emerge through the entrance of the bag body, where a second patch (5') overlaps said patch (5), which is also fixed by means of thermal welding or any other suitable means, but with the peculiarity that the second patch (5') is fixed to the first patch (5) on the surface of the latter unrelated to said "U-shaped" strip (15).

the invention claimed is:

1. A continuous band for manufacturing bags for horticultural products, said continuous band comprising:

a continuous plastic sheet having a first side, a second side, a first longitudinal edge and a second longitudinal edge, and being configured to be closed by a longitudinal seam along the first and second longitudinal edges, so as to form a continuous tube capable of being fragmented into a plurality of portions corresponding to respective bags, the first side being an inner side of the bags and the second side being an outer side of the bags, wherein each portion of the plurality of portions includes at least one window, the at least one window being configured to be sealed with a mesh fragment sized and configured to cover the window and be fixed to a periphery of the window, wherein each of the portions of the plurality of portions of the continuous plastic sheet includes a patch disposed on the first side of the continuous plastic sheet in an area corresponding to a handle area, in which substantial tension is concentrated in a transport situation, the patch being fixed to the first side of the continuous plastic sheet by one of thermal welding and gluing, and having a rigidity so as to enable a reduction in a thickness of the continuous plastic sheet.

2. A continuous band for manufacturing bags for horticultural products according to claim 1, wherein the patch for each of the portions of the plurality of portions of the continuous plastic sheet is rectangular and is disposed transversely on an area of implantation thereof.

3. A continuous band for manufacturing bags for horticultural products according to claim 1, wherein the patch for each of the portions of the plurality of portions of the continuous plastic sheet is a first patch of first and second patches, the first patch having a punching line that delimits a U-shaped strip, the delimiting line affecting the patch and the sheet, the U-shaped strip forming the handle, which is configured to emerge through an entrance of the respective bag, and the second patch is configured to overlap the first patch and be fixed thereto by thermal welding on a surface of the first patch unrelated to the U-shaped strip.

4. A continuous band for manufacturing bags for horticultural products, according to claim 3, wherein the punching line comprises pre-cut or sliding lines that maintain the U-shaped strip in a coplanar position with the remainder of the patch and sheet, and enable the U-shaped strip to be torn at the time of use of the handle, by folding the U-shaped strip towards an exterior of the respective bag.

5. A continuous band for manufacturing bags for horticultural products, according to claim 4, wherein for each of the portions of the plurality of portions of the continuous plastic sheet, the first and second patches correspond to two points at the entrance of the respective bag, the two points being diametrically opposed to each other, such that each bag includes two handles that emerge from the entrance of the bag and are diametrically opposed.

6. A continuous band for manufacturing bags for horticultural products, according to claim 3, wherein for each of the portions of the plurality of portions of the continuous plastic sheet, the first and second patches correspond to two points at the entrance of the respective bag, the two points being diametrically opposed to each other, such that each bag includes two handles that emerge from the entrance of the bag and are diametrically opposed.

* * * * *